(12) United States Patent
Nonaka et al.

(10) Patent No.: US 10,539,721 B2
(45) Date of Patent: Jan. 21, 2020

(54) DIFFUSION SHEET, BACKLIGHT UNIT, AND LIQUID CRYSTAL DISPLAY DEVICE

(71) Applicant: KEIWA Inc., Tokyo (JP)

(72) Inventors: Tadayuki Nonaka, Tokyo (JP);
Hironobu Imakita, Tokyo (JP);
Kenichi Harada, Tokyo (JP)

(73) Assignee: Keiwa Inc., Tokyo (JP)

( * ) Notice: Subject to any disclaimer, the term of this patent is extended or adjusted under 35 U.S.C. 154(b) by 0 days.

(21) Appl. No.: 16/247,320

(22) Filed: Jan. 14, 2019

(65) Prior Publication Data

US 2019/0219744 A1 Jul. 18, 2019

(30) Foreign Application Priority Data

Jan. 15, 2018 (JP) ................................. 2018-004412

(51) Int. Cl.
*G02B 5/02* (2006.01)
*F21V 8/00* (2006.01)

(52) U.S. Cl.
CPC ......... *G02B 5/0226* (2013.01); *G02B 5/0221* (2013.01); *G02B 5/0278* (2013.01); *G02B 6/0051* (2013.01); *G02B 6/0053* (2013.01); *G02B 6/0068* (2013.01)

(58) Field of Classification Search
CPC .................................................... G02B 5/0226
See application file for complete search history.

(56) References Cited

U.S. PATENT DOCUMENTS

| | | | |
|---|---|---|---|
| 2011/0096402 A1 | 4/2011 | Sun et al. | |
| 2013/0061459 A1* | 3/2013 | Morin | C25B 9/10 29/623.1 |
| 2016/0054484 A1* | 2/2016 | Kikuchi | G02B 5/0278 362/330 |
| 2019/0004237 A1* | 1/2019 | Kitano | B32B 7/02 |

FOREIGN PATENT DOCUMENTS

| | | |
|---|---|---|
| JP | 2012-226290 A | 11/2012 |
| TW | I408405 B1 | 9/2013 |

* cited by examiner

*Primary Examiner* — Edmond C Lau
(74) *Attorney, Agent, or Firm* — Knobbe, Martens, Olson & Bear, LLP

(57) ABSTRACT

A diffusion sheet includes a resin base layer that is light transmissive and a light diffusion layer provided on one surface of the resin base layer, and including titanium oxide particles, resin beads and a binder resin. The percentage by mass of the titanium oxide particle in the binder resin is 190 to 250% by mass, and the light diffusion layer has a mass per unit area of 6.0 to 7.0 g/m².

6 Claims, 9 Drawing Sheets

FIG.5

| | TEST EXAMPLE 1 | TEST EXAMPLE 2 | TEST EXAMPLE 3 | TEST EXAMPLE 4 | TEST EXAMPLE 5 | TEST EXAMPLE 6 | TEST EXAMPLE 7 | TEST EXAMPLE 8 |
|---|---|---|---|---|---|---|---|---|
| CONTENT OF TITANIUM OXIDE(g/m$^2$) | 2.1000 | 2.6250 | 2.8875 | 3.1500 | 3.4125 | 3.6750 | 3.9375 | 5.2500 |
| CONTENT OF RESIN BEADS(g/m$^2$) | 0.9000 | 1.1250 | 1.2375 | 1.3500 | 1.4625 | 1.5750 | 1.6875 | 2.2500 |
| CONTENT OF BINDER RESIN(g/m$^2$) | 1.0000 | 1.2500 | 1.3750 | 1.5000 | 1.6250 | 1.7500 | 1.8750 | 2.5000 |
| COATING AMOUNT (g/m$^2$) | 4.0 | 5.0 | 5.5 | 6.0 | 6.5 | 7.0 | 7.5 | 10 |
| AMOUNT OF TITANIUM OXIDE ADDED(% BY MASS) | 210 | 210 | 210 | 210 | 210 | 210 | 210 | 210 |
| PARTICLE DIAMETER OF TITANIUM OXIDE($\mu$m) | 0.34 | 0.34 | 0.34 | 0.34 | 0.34 | 0.34 | 0.34 | 0.34 |
| EVALUATION RESULT OF CONCEALING PROPERTY | × | × | × | ○ | ○ | ○ | ○ | ○ |
| CHROMATICITY($\Delta$y) | 0.0003 | 0.0010 | 0.0012 | 0.0014 | 0.0015 | 0.0018 | 0.0023 | 0.0047 |

FIG.6

| | TEST EXAMPLE 9 | TEST EXAMPLE 10 | TEST EXAMPLE 11 | TEST EXAMPLE 12 | TEST EXAMPLE 13 | TEST EXAMPLE 14 | TEST EXAMPLE 15 | TEST EXAMPLE 16 | TEST EXAMPLE 17 | TEST EXAMPLE 18 |
|---|---|---|---|---|---|---|---|---|---|---|
| CONTENT OF TITANIUM OXIDE(g/m$^2$) | 2.4375 | 2.9250 | 3.0875 | 3.7375 | 4.0625 | 4.5500 | 5.0872 | 1.7727 | 3.4125 | 3.4125 |
| CONTENT OF RESIN BEADS(g/m$^2$) | 2.4375 | 1.9500 | 1.7875 | 1.1375 | 0.8125 | 0.3250 | 0.0000 | 2.7575 | 1.4625 | 1.4625 |
| CONTENT OF BINDER RESIN(g/m$^2$) | 1.6250 | 1.6250 | 1.6250 | 1.6250 | 1.6250 | 1.6250 | 1.4131 | 1.9698 | 1.6250 | 1.6250 |
| COATING AMOUNT (g/m$^2$) | 6.5 | 6.5 | 6.5 | 6.5 | 6.5 | 6.5 | 6.5 | 6.5 | 6.5 | 6.5 |
| AMOUNT OF TITANIUM OXIDE ADDED(% BY MASS) | 150 | 180 | 190 | 230 | 250 | 280 | 360 | 90 | 210 | 210 |
| PARTICLE DIAMETER OF TITANIUM OXIDE($\mu$m) | 0.34 | 0.34 | 0.34 | 0.34 | 0.34 | 0.34 | 0.34 | 0.26 | 0.26 | 1.0 |
| EVALUATION RESULT OF CONCEALING PROPERTY | × | × | ○ | ○ | ○ | ○ | ○ | × | ○ | × |
| CHROMATICITY($\Delta$y) | 0.0011 | 0.0014 | 0.0014 | 0.0016 | 0.0019 | 0.0021 | 0.0029 | 0.0000 | 0.0049 | 0.0012 |

DIFFUSION SHEET, BACKLIGHT UNIT, AND LIQUID CRYSTAL DISPLAY DEVICE

CROSS-REFERENCE TO RELATED APPLICATION

This application claims priority to Japanese Patent Application No. 2018-004412 filed on Jan. 15, 2018, the entire disclosure of which is incorporated by reference herein.

BACKGROUND

The present disclosure relates to diffusion sheets, backlight units, and liquid crystal display devices. Recently, liquid crystal display devices have been widely used as flat panel displays. Such liquid crystal display devices include a liquid crystal display panel in which a liquid crystal layer is sealed between a thin film transistor (TFT) substrate and a color filter (CF) substrate, and a backlight unit provided to a back surface of the liquid crystal display panel. For example, the backlight unit includes a rectangular-shaped light guide plate, a plurality of light sources provided along one side surface of the light guide plate, a diffusion sheet and a prism sheet which are sequentially provided on the front surface of the light guide plate, and a reflection sheet provided on the back surface of the light guide plate.

For example, Japanese Unexamined Patent Publication No. 2012-226290 discloses a diffusion sheet having a plurality of grooves on at least one surface thereof, the grooves being randomly arranged in parallel to each other.

SUMMARY

In some cases, upon the lighting-up of the light source in the backlight unit, e.g., a bright spot caused by a scratch formed on the surface of the light guide plate, a white dot pattern printed on the back surface of the light guide plate, and a hot spot due to a plurality of light sources disposed adjacent to the side surface of the light guide plate may be visible on the surface of the diffusion sheet, resulting in deterioration of appearance. Thus, it has been required to conceal such spots or patterns by the diffusion sheet. Here, for example, a diffusion sheet having a surface on which a light diffusion layer including titanium oxide is disposed can improve its concealing property by increasing the content of titanium oxide in the light diffusion layer. However, this increase may make yellowness of the sheet strong.

The present disclosure is conceived in view of the above problems, and attempts to provide a technique of reducing yellowness of a diffusion sheet while improving the concealing property of the diffusion sheet.

In order to achieve the above attempt, a diffusion sheet according to the present disclosure includes: a resin base layer that is light transmissive; and a light diffusion layer provided on one surface of the resin base layer and including a plurality of titanium oxide particles, a plurality of resin beads, and a binder resin. The percentage by mass of the titanium oxide particle in the binder resin is 190 to 250% by mass, and the light diffusion layer has a mass per unit area of 6.0 to 7.0 g/m$^2$.

According to the above configuration, the percentage by mass of the titanium oxide particle to the binder resin is 190 to 250% by mass, and the mass per unit area of the light diffusion layer is 6.0 to 7.0 g/m$^2$. This can improve the concealing property of the diffusion sheet while reducing the yellowness of the diffusion sheet.

BRIEF DESCRIPTION OF THE DRAWINGS

FIG. 5 is a table showing test examples 1 to 8 of the diffusion sheet according to the first embodiment of the present disclosure.

FIG. 6 is a table showing test examples 9 to 18 of the diffusion sheet according to the first embodiment of the present disclosure.

DETAILED DESCRIPTION

Embodiments of the present disclosure will now be described in detail with reference to the drawings. The present disclosure is not limited to the following embodiments.

First Embodiment

Figure 1:
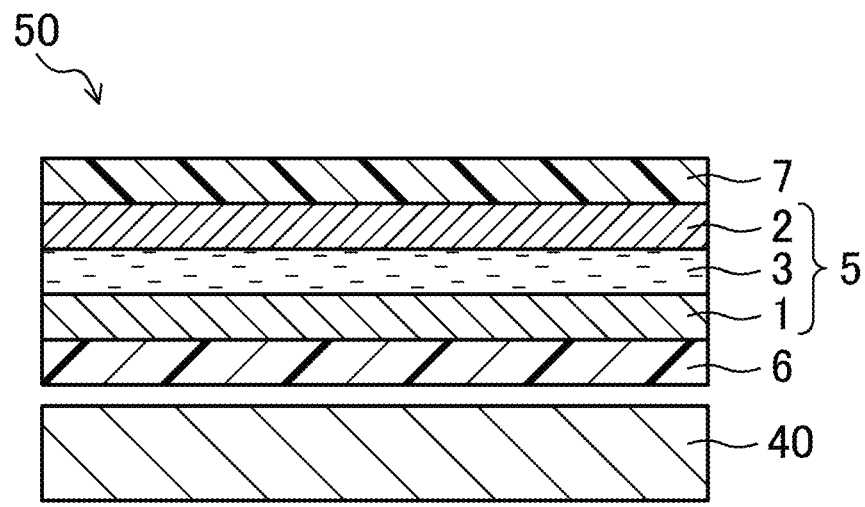
FIG. 1 is a cross-sectional view of a liquid crystal display device according to a first embodiment of the present disclosure.
Figure 2:
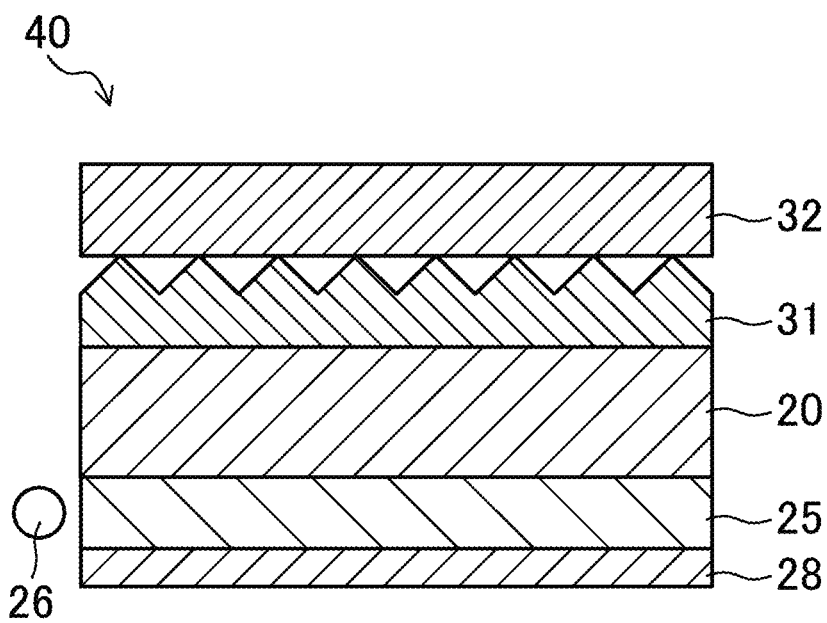
FIG. 2 is a cross-sectional view of a backlight unit included in the liquid crystal display device according to the first embodiment of the present disclosure.
Figure 3:
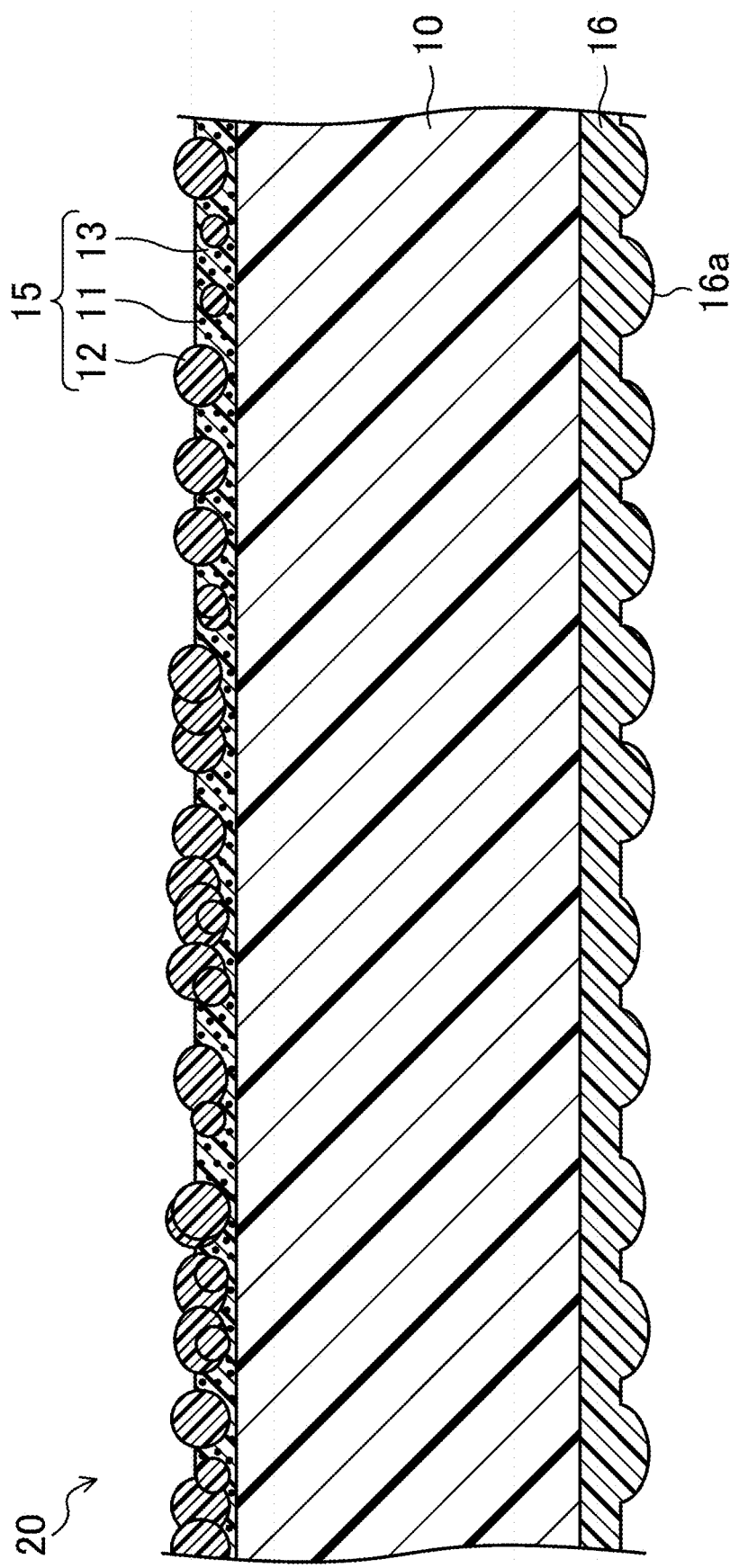
FIG. 3 is a cross-sectional view of a diffusion sheet included in the backlight unit according to the first embodiment of the present disclosure.
Figure 4:
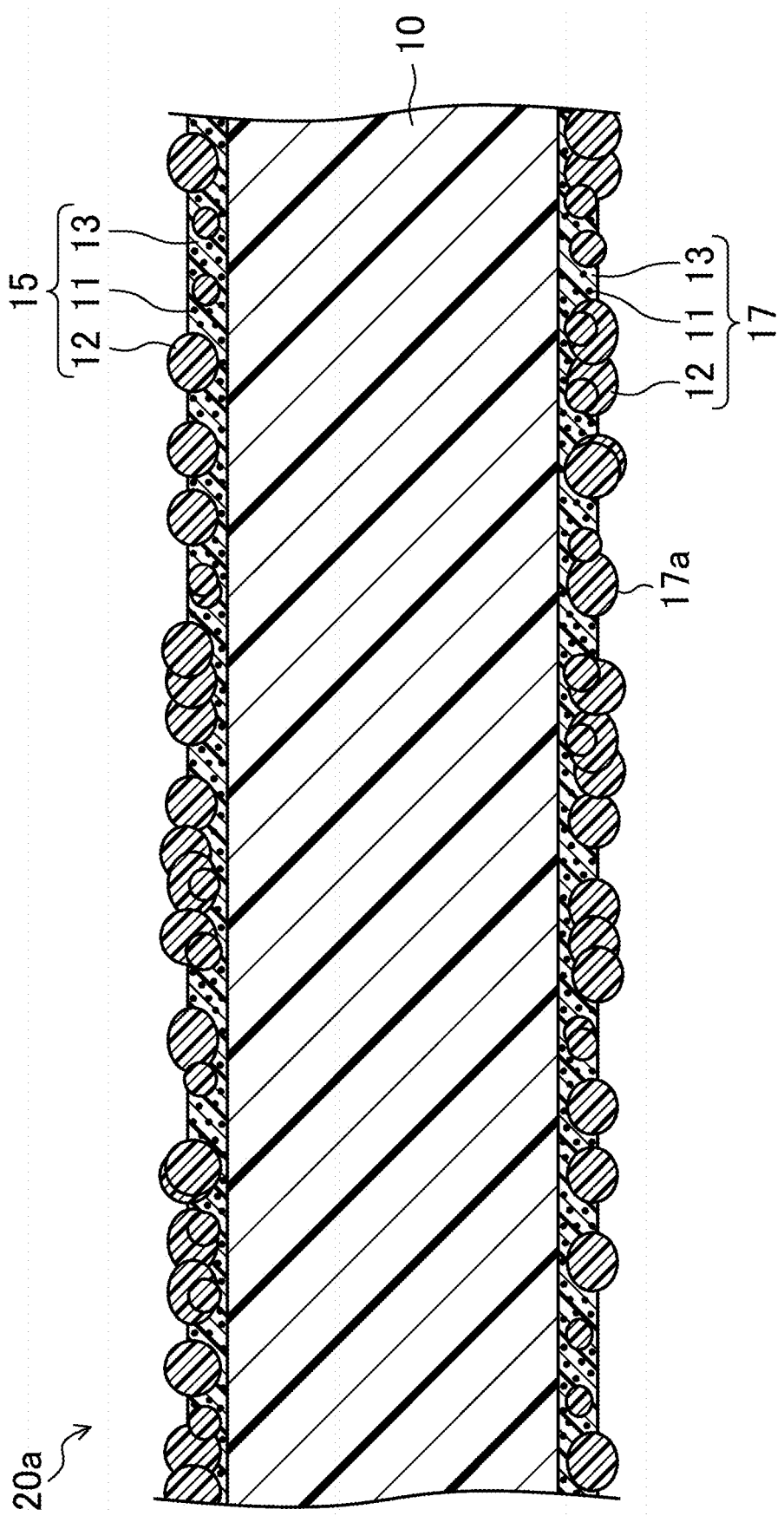
FIG. 4 is a cross-sectional view of a diffusion sheet included in a backlight unit according to a variation of the first embodiment of the present disclosure.

FIGS. 1 to 10 show a diffusion sheet, a backlight unit, and a liquid crystal display device according to a first embodiment of the present disclosure. FIG. 1 is a cross-sectional view of a liquid crystal display device 50 according to this embodiment. FIG. 2 is a cross-sectional view of a backlight unit 40 included in the liquid crystal display device 50. FIG. 3 is a cross-sectional view of a diffusion sheet 20 included in the backlight unit 40. FIG. 4 is a cross-sectional view of a diffusion sheet 20a that is a variation of the diffusion sheet 20.

As shown in FIG. 1, the liquid crystal display device 50 includes a liquid crystal display panel 5, a first polarizing plate 6 attached to a back surface (a lower surface in the figure) of the liquid crystal display panel 5, a second polarizing plate 7 attached to a front surface (an upper surface in the figure) of the liquid crystal display panel 5, and a backlight unit 40 provided adjacent to the back surface (the lower surface in the figure) of the liquid crystal display panel 5 through the first polarizing plate 6.

As shown in FIG. 1, the liquid crystal display panel 5 includes a thin film transistor (TFT) substrate 1, a color filter (CF) substrate 2, a liquid crystal layer 3, and a sealant (not shown). The TFT substrate 1 and the CF substrate 2 are provided to face each other. The liquid crystal layer 3 is provided between the TFT substrate 1 and the CF substrate 2. The sealant is formed in a frame shape to seal the liquid crystal layer 3 between the TFT substrate 1 and the CF substrate 2.

The TFT substrate 1 includes a plurality of TFTs, an interlayer insulating film, a plurality of pixel electrodes, and an alignment film. The plurality of TFTs are arranged in a matrix on, e.g., a glass substrate. The interlayer insulating film covers each of the TFTs. The plurality of pixel electrodes are arranged in a matrix on the interlayer insulating film, and are connected to the respective TFTs. The alignment film covers each of the pixel electrodes. Each of the TFTs is electrically connected to a corresponding one of gate lines extending parallel to each other on, e.g., the glass substrate. Each of the TFTs is also electrically connected to a corresponding one of source lines extending parallel to each other on, e.g., a gate insulating film covering the gate lines in a direction orthogonal to the gate lines.

The CF substrate 2 includes a lattice-like black matrix formed on, e.g., a glass substrate, color filters including red layers, green layers, and blue layers arranged in open regions of the lattice of the black matrix, a common electrode covering the black matrix and the color filter, and an alignment film covering the common electrode.
The liquid crystal layer 3 is made of, e.g., a nematic liquid crystal material including liquid crystal molecules having electro-optic characteristics.

Each of the first polarizing plate 6 and the second polarizing plate 7 includes a polarizer layer having, e.g., a polarization axis in one direction, and a pair of protective layers sandwiching the polarizer layer. The polarizer layer is configured as, e.g., a polyvinyl alcohol film stretched with, e.g., iodine adsorbed thereon. The protective layer is configured as, e.g., a triacetylcellulose (TAC) film.

As shown in FIG. 2, the backlight unit 40 includes the diffusion sheet 20, first and second prism sheets 31 and 32, a light guide plate 25, a plurality of light emitting diodes (LEDs) 26, and a reflection sheet 28. The first and second prism sheets 31 and 32 are sequentially provided on the diffusion sheet 20 in the figure. The light guide plate 25 is provided under the diffusion sheet 20 in the figure. The LEDs 26 are provided on a side of the light guide plate 25 as light sources (dot light sources). The reflection sheet 28 is provided under the light guide plate 25 in the figure.

As shown in FIG. 3, the diffusion sheet 20 includes a resin base layer 10, a light diffusion layer 15 provided on one surface (the upper surface in the figure) of the resin base layer 10, and an uneven resin layer 16 provided on the other surface (the lower surface in the figure) of the resin base layer 10.

The resin base layer 10 is light transmissive, and is configured as, e.g., a transparent, translucent, or opalescent film having a thickness of about 20 to 50 µm. Examples of materials of the film include a polyethylene terephthalate resin, a polyethylene naphthalate resin, an acrylic resin, a polycarbonate resin, a polystyrene resin, a polyolefin resin, a cellulose acetate resin, and a light-resistant polyvinyl chloride resin.

The light diffusion layer 15 has a thickness of, e.g., about 8 µm, and as shown in FIG. 3, includes titanium oxide particles 11, resin beads 12, and a binder resin 13. The titanium oxide particles 11 and the resin beads 12 are fixed to the surface of the resin base layer 10 through the binder resin 13. The percentage by mass of the titanium oxide particles 11 to the binder resin 13 is about 190 to 250% by mass, for example. The light diffusion layer 15 has a mass per unit area of, e.g., 6.0 to 7.0 g/m².

The titanium oxide particles 11 have an average particle diameter of, e.g., about 0.34 µm.

The resin beads 12 are organic fine particles having an average particle diameter of, e.g., about 8 µm, and made of, e.g., an acrylic resin, an acrylonitrile resin, a polyurethane resin, a polyvinyl chloride resin, a polystyrene resin, or a polyamide resin.

The binder resin 13 is made of, e.g., an acrylic resin, an epoxy resin, a silicone resin, a phenol resin, a urea resin, an unsaturated polyester resin, a melamine resin, an alkyd resin, a polyimide resin, an amide functional copolymer resin, or a urethane resin.

The uneven resin layer 16 has a thickness of, e.g., about 8 µm, and is made of, e.g., an acrylic resin, an epoxy resin, a silicone resin, a phenol resin, a urea resin, an unsaturated polyester resin, a melamine resin, an alkyd resin, polyimide resin, an amide functional copolymer resin, or a urethane resin. Also, as shown in FIG. 3, the uneven resin layer 16 has an uneven surface 16a, thereby reducing or avoiding close contact between the uneven resin layer 16 and the surface of the light guide plate 25. The embodiment has exemplified the uneven resin layer 16 simply having the uneven surface 16a. Alternatively, as shown in FIG. 4, the uneven resin layer 16 may be replaced with an uneven resin layer 17 having an uneven surface 17a, i.e., having a same or similar configuration to the light diffusion layer 15. Specifically, as shown in FIG. 4, the diffusion sheet 20a of the variation is provided with the light diffusion layer 15 on one surface (the upper surface in the figure) of the resin base layer 10, and the uneven resin layer 17 on the other surface (the lower surface in the figure) of the resin base layer 10. As shown in FIG. 4, the uneven resin layer 17 includes the titanium oxide particles 11, the resin beads 12, and the binder resin 13. The titanium oxide particles 11 and the resin beads 12 are fixed to the surface (the back surface) of the resin base layer 10 through the binder resin 13, constituting another light diffusion layer. The uneven resin layer 17 has such a configuration in which the titanium oxide particles 11 and the resin beads 12 are included in the binder resin 13, thereby reducing or avoiding close contact between the uneven resin layer 17 and the surface of the light guide plate 25. In addition, this can improve the concealing property of the diffusion sheet 20a. The variation has exemplified the uneven resin layer 17 having a configuration in which the titanium oxide particles 11 and the resin beads 12 are included in the binder resin 13. The resin beads 12 may be omitted from the uneven resin layer 17.

Each of the first prism sheet 31 and the second prism sheet 32 is a film made of, e.g., an acrylic resin, and has a plurality of adjacent grooves having an isosceles triangle-shaped cross-section, an adjacent pair of the grooves forming a prism whose vertex angle is about 90°. Here, the grooves formed in the first prism sheet 31 and the grooves formed in the second prism sheet 32 are disposed so as to be orthogonal to each other. The embodiment has exemplified the configuration in which the first prism sheet 31 and the second prism sheet 32 separately formed are stacked one on the other. The first prism sheet 31 and the second prism sheet 32 may be integrated with each other.

The light guide plate 25 is formed in a rectangular plate shape, and is configured as a transparent resin such as an acrylic resin and a polycarbonate resin. The light guide plate 25 has a surface adjacent to the reflection sheet 28 and having a white dot pattern P (see FIG. 10B) printed thereon to allow the surface to uniformly emit light.

The LEDs 26 are aligned with each other along one short side surface of the light guide plate 25.

The reflection sheet 28 is configured as, e.g., a white film made of a polyethylene terephthalate resin, or a silver-evaporated film.

In the above-described liquid crystal display device 50, a predetermined voltage is applied to the liquid crystal layer 3 in sub-pixels corresponding to the respective pixel electrodes to change the alignment state of the liquid crystal layer 3, thereby adjusting the transmittance of incident light from the backlight unit 40 through the first polarizing plate 6. Then, the adjusted light is emitted through the second polarizing plate 7, thereby displaying an image.

Figure 7:
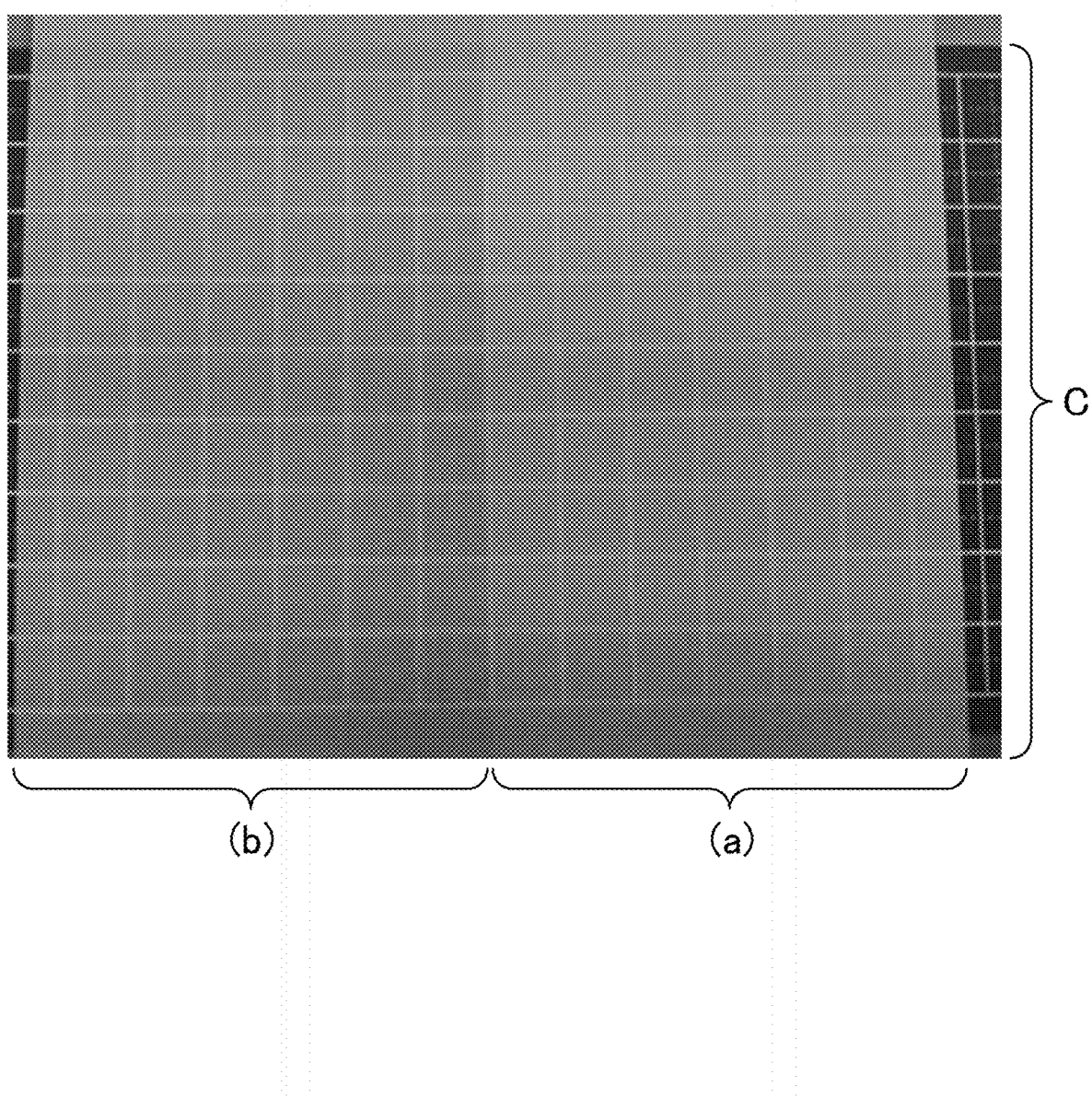
FIG. 7 is a photograph showing a method for evaluating the concealing property of the diffusion sheet according to the first embodiment of the present disclosure.

Next, specific tests conducted will be described. Here, FIG. 5 shows test examples 1 to 8 of the diffusion sheet 20, and FIG. 6 shows test examples 9 to 18 of the diffusion sheet 20. FIG. 7 is a photograph showing a method for evaluating the concealing property of the diffusion sheet 20.

First, coating materials (its solid content concentration: about 40 to 50% by mass) for test examples 1 to 18 were prepared using titanium oxide particles having an average particle diameter of 0.26 μm, titanium oxide particles having an average particle diameter of 0.34 μm, titanium oxide particles having an average particle diameter of 1.0 μm, resin beads made of an acrylic resin and having an average particle diameter of 8 μm, a thermosetting binder resin (acrylic resin), and an organic solvent such as methyl ethyl ketone, ethyl acetate, or butyl acetate. The contents of these materials are shown in the tables of FIGS. 5 and 6. Thereafter, each coating material prepared was coated and dried on one surface of a polyethylene terephthalate film having a thickness of 38 μm, thereby forming, on one surface of the resin base layer (10), the light diffusion layer (15) having a thickness of 8 μm for each test example.

Subsequently, on a surface of the resin base layer (10) remote from the light diffusion layer (15) for each test example was formed, an uncured, ultraviolet-curable acrylic resin was coated, and then, the coated film was irradiated with ultraviolet light while being pressed with a pressure roller having an irregular shape in its periphery, thereby curing the uncured acrylic resin. As can be seen, the uneven resin layer (16) having a thickness of 8 μm was formed on the surface of the resin base layer (10), thereby producing the diffusion sheets (20) for test examples 1 to 18.

Further, as shown in FIG. 7, with the diffusion sheets (20) produced for test examples 1 to 18 being placed on a commercially available cutting mat C (a green mat on which white solid and dotted lines are printed), the degree of difficulty in seeing the white lines printed on the surface of the cutting mat C was evaluated. Here, in the tables in FIGS. 5 and 6, the degree of difficulty in seeing the white lines through the diffusion sheet (20) in test example 16 showing relatively low concealing property was evaluated as "×." Higher degrees of difficulty in seeing the white lines than the degree of difficulty in test example 16 were evaluated as "◯." In FIG. 7, (a) shows the diffusion sheet (20) in test example 5, and (b) shows the diffusion sheet (20) in test example 16.

Also, the diffusion sheets (20) produced for test examples 1 to 18 were incorporated as the diffusion sheet 20 of the above-described backlight unit 40, and the chromaticity of the surface of the prism sheet 32 was measured using a luminance meter BM-7 manufactured by TOPCON TECHNOHOUSE CORPORATION with the backlight unit 40 lit at a luminance of 8000 to 9000 cd/m². Here, Δy in the tables of FIGS. 5 and 6 indicates a difference between the chromaticity of each test example and the chromaticity of test example 16 showing relatively low yellowness. If Δy was 0.0020 or less, it was evaluated that the yellowness had no problem.

The test results showed as follows: As shown in the table of FIG. 5, in test examples 1 to 8 where the amount of titanium oxide particles added (the percentage by mass of the titanium oxide particles) was constantly 210% by mass, if the coating amount (the mass per unit area of the light diffusion layer) was 6.0 g/m² or more, the concealing property was ensured. However, if the coating amount exceeded 7.0 g/m², the yellowness increased to a level posing a problem.

Also, as shown in the table of FIG. 6, in test examples 9 to 15 where the coating amount was constantly 6.5 g/m², if the amount of titanium oxide particles added was 190% by mass or more, the concealing property was ensured. However, if the amount of titanium oxide particles added exceeded 250% by mass, the yellowness increased to a level posing a problem.

Also, in test examples 16 and 17 using titanium oxide particles having a smaller diameter, increasing the amount of the titanium oxide particles added ensured the concealing property, whereas the yellowness increased to a level posing a problem.

Also, in test example 18 using titanium oxide particles having a larger diameter, the concealing property was not ensured.

Accordingly, it was found that, like test examples 4 to 6 and 11 to 13, the coating amount ranging from 6.0 to 7.0 g/m² and the amount of titanium oxide added ranging from 190 to 250% by mass could improve the concealing property while reducing the yellowness. It was also found that a coating amount less than 6.0 g/m² could not ensure the concealing property, and a coating amount more than 7.0 g/m² made the yellowness too strong, as described above. It was also found that a percentage by mass of the titanium oxide particles less than 190% by mass could not ensure the concealing property, and a percentage by mass of the titanium oxide particles more than 250% by mass made the yellowness too strong, as described above.

Figure 8A:
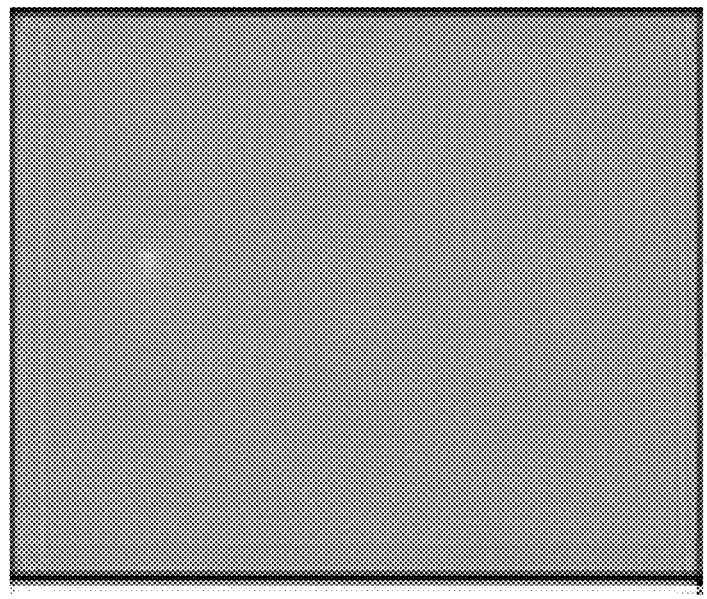
FIGS. 8A and 8B are photographs showing the concealing property of the diffusion sheet according to the first embodiment of the present disclosure, that is to say, the property of concealing a bright spot.
Figure 8B:
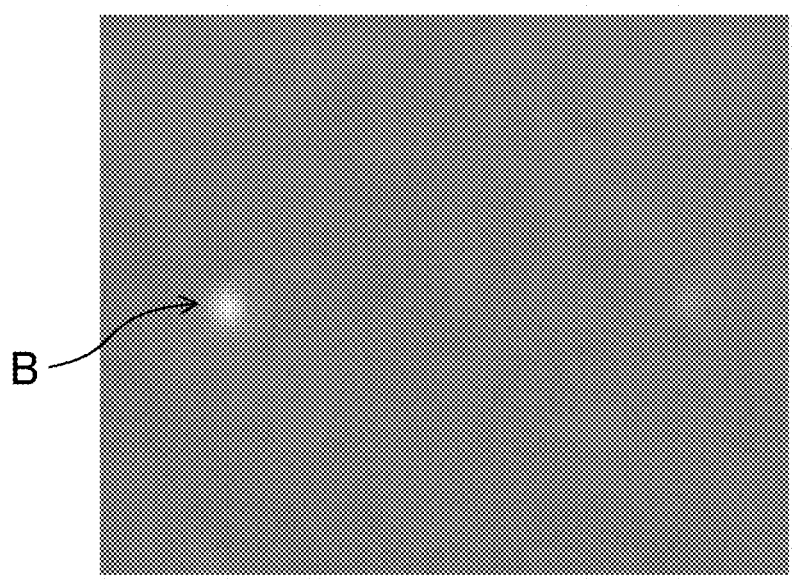
Figure 9A:
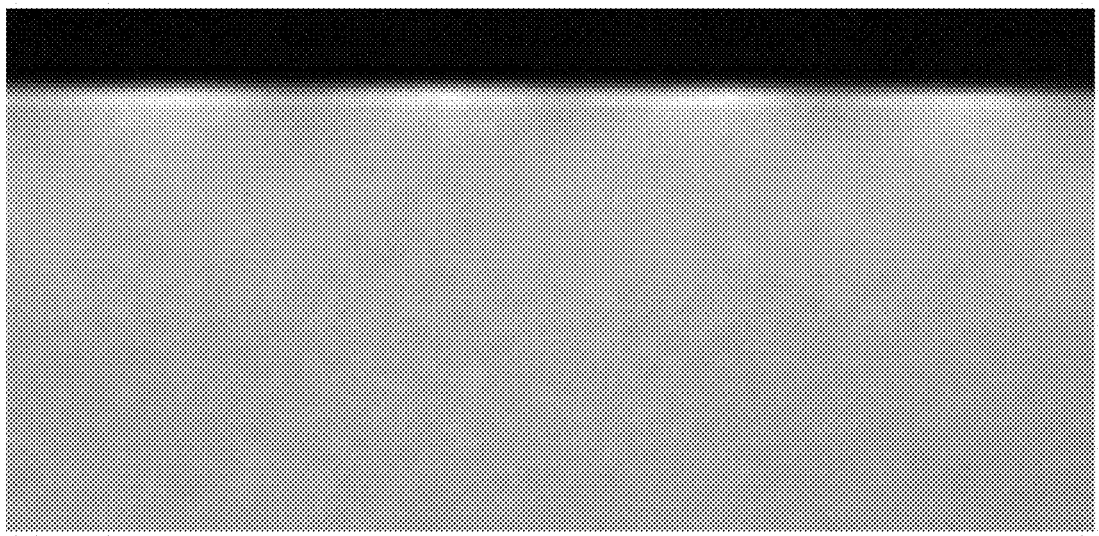
FIGS. 9A and 9B are photographs showing the concealing property of the diffusion sheet according to the first embodiment of the present disclosure, that is to say, the property of concealing a hot spot due to light sources.
Figure 9B:
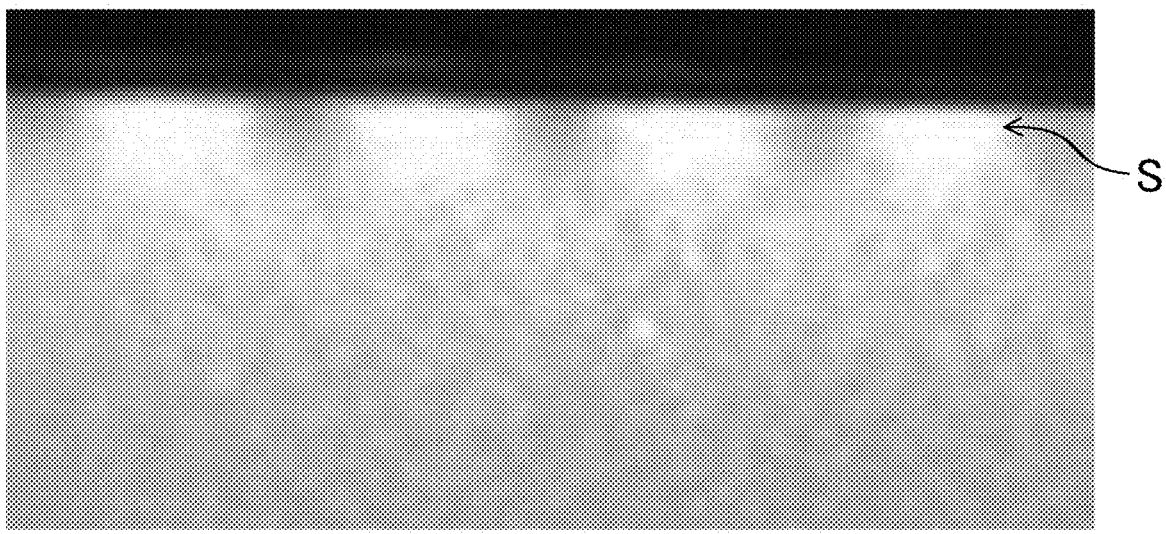
Figure 10A:
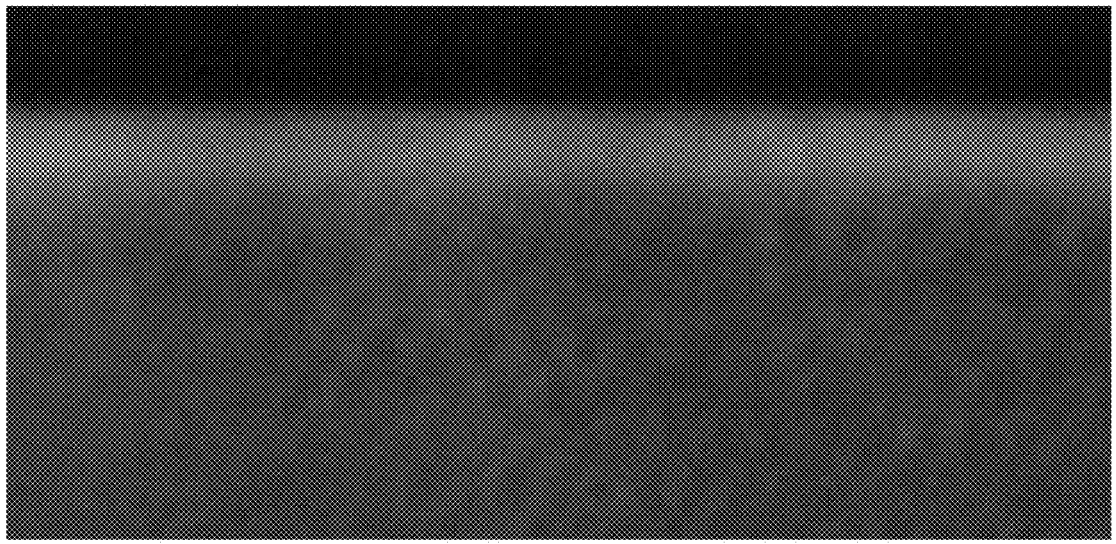
FIGS. 10A and 10B are photographs showing the concealing property of the diffusion sheet according to the first embodiment of the present disclosure, that is to say, the property of concealing a dot pattern.
Figure 10B:
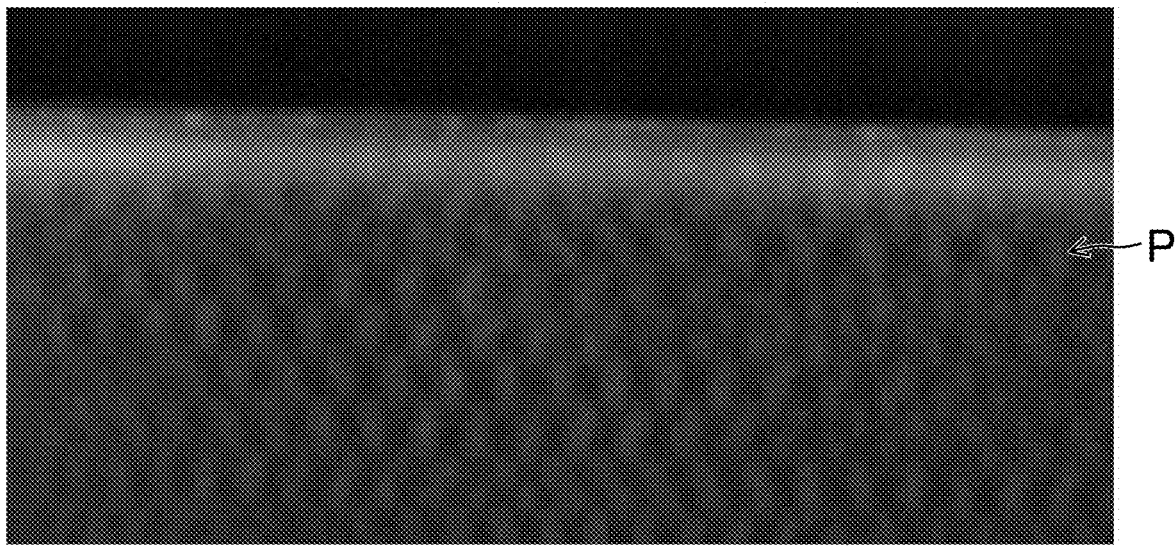

Next, appearances of the sheets in test examples 5 and 16 were evaluated using an actual machine. FIGS. 8A and 8B are photographs showing the concealing property of the diffusion sheet 20, that is to say, the property of concealing a bright spot B. FIG. 8A shows the photograph using test example 5, and FIG. 8B shows the photograph using test example 16. FIGS. 9A and 9B are photographs showing the concealing property of the diffusion sheet 20, that is to say, the property of concealing a hot spot S due to the LEDs 26. FIG. 9A shows the photograph using test example 5, and FIG. 9B shows the photograph using test example 16. FIGS. 10A and 10B are photographs showing the concealing property of the diffusion sheet 20, that is to say, the property of concealing a dot pattern P. FIG. 10A shows the photograph using test example 5, and FIG. 10B shows the photograph using test example 16.

First, the surface, of the light guide plate 25, adjacent to the diffusion sheet 20 included in the above-described backlight unit 40 was scratched with a tapered metal bar such as a needle to make a scratch with a diameter of about 100 to 300 μm on the surface. Then, the diffusion sheet (20) of test example 5 or 16 was placed on the surface. Then, the bright spot on the surface of the prism sheet 32 was visually checked with the backlight unit 40 lit at a luminance of 8000 to 9000 cd/m². The test results showed that the bright spot B was clearly viewed through the diffusion sheet (20) in test example 16 as shown in FIG. 8B, and it was difficult to see the bright spot (B) through the diffusion sheet (20) of test example 5 as shown in FIG. 8A.

Next, the diffusion sheet (20) of test example 5 or 16 was incorporated as the diffusion sheet 20 of the above-described backlight unit 40, and the vicinity of the LEDs was visually checked with the backlight unit 40 lit at a luminance of 8000 to 9000 cd/m$^2$. The test results showed that the hot spot S due to the array of LEDs 26 was clearly viewed through the diffusion sheet (20) of test example 16 as shown in FIG. 9B, and it was difficult to see the hot spot (S) through the diffusion sheet (20) of test example 5 as shown in FIG. 9A.

Next, the diffusion sheet (20) of test example 5 or 16 was incorporated as the diffusion sheet 20 of the above-described backlight unit 40, and the surface of the prism sheet 32 was visually checked with the backlight unit 40 lit at a luminance of 8000 to 9000 cd/m$^2$. The test results showed that the dot pattern P printed on the light guide plate 25 was clearly viewed through the diffusion sheet (20) of test example 16 as shown in FIG. 10B, and it was difficult to see the dot pattern (P) through the diffusion sheet (20) of test example 5 as shown in FIG. 10A.

As can be seen from the foregoing description, according to the diffusion sheet 20, the backlight unit 40, and the liquid crystal display device 50 of the embodiment, the percentage by mass of the titanium oxide particles 11 in the binder resin 13 is 190 to 250% by mass, and the mass per unit area of the light diffusion layer 15 is 6.0 to 7.0 g/m$^2$. This can improve the concealing property of the diffusion sheet 20 while reducing the yellowness of the diffusion sheet 20.

Also, according to the diffusion sheet 20, the backlight unit 40, and the liquid crystal display device 50 of the embodiment, the uneven resin layer 16 having the uneven surface 16a is formed on the surface of the resin base layer 10. This can reduce or avoid close contact between the diffusion sheet 20 and the light guide plate 25, reducing luminance unevenness of the backlight unit 40 due to the close contact.

Also, according to the diffusion sheet 20, the backlight unit 40, and the liquid crystal display device 50 of the embodiment, the concealing property of the diffusion sheet 20 is improved. This can make it difficult to see the bright spot B due to a scratch formed on or a foreign matter attached on the surface of the light guide plate 25.

Also, according to the diffusion sheet 20, the backlight unit 40, and the liquid crystal display device 50 of the embodiment, the concealing property of the diffusion sheet 20 is improved. This can make it difficult to see the dot pattern P printed on the surface of the light guide plate 25.

Also, according to the diffusion sheet 20, the backlight unit 40, and the liquid crystal display device 50 of the embodiment, the concealing property of the diffusion sheet 20 is improved. This can make it difficult to see the hot spot S due to the array of the LEDs 26 disposed along the side surface of the light guide plate 25.

Also, according to the diffusion sheet 20a of the embodiment, the uneven resin layer 17 is another light diffusion layer including the titanium oxide particles 11, the resin beads 12, and the binder resin 13. Such a configuration can further improve the concealing property of the diffusion sheet 20a. As a result, the backlight unit 40 including the diffusion sheet 20a can make it further difficult to see the bright spot B due to a scratch formed on or a foreign matter attached on the surface of the light guide plate 25, the dot pattern P printed on the surface of the light guide plate 25, and the hot spot S due to the array of the LEDs 26 disposed along the side surface of the light guide plate 25.

Other Embodiments

The first embodiment has exemplified the liquid crystal display device including the backlight unit provided with the plurality of LEDs as edge light sources. The present disclosure can also be applied to a liquid crystal display device provided with, e.g., a cold cathode fluorescent lamp (CCFL) as an edge light source.

In view of the foregoing description, the present disclosure can improve concealing property while reducing yellowness. Thus, the present disclosure is useful for a diffusion sheet included in a backlight unit of a liquid crystal display device.

What is claimed is:

1. A diffusion sheet comprising:
    a resin base layer that is light transmissive; and
    a light diffusion layer provided on one surface of the resin base layer and including a plurality of titanium oxide particles, a plurality of resin beads, and a binder resin, wherein
    a percentage by mass of the titanium oxide particle in the binder resin is 190 to 250% by mass, and
    the light diffusion layer has a mass per unit area of 6.0 to 7.0 g/m$^2$.

2. The diffusion sheet of claim 1, wherein
    the other surface of the resin base layer is provided with an uneven resin layer having an uneven surface.

3. The diffusion sheet of claim 2, wherein
    the uneven resin layer is another light diffusion layer including a plurality of titanium oxide particles, a plurality of resin beads, and a binder resin.

4. A backlight unit comprising:
    the diffusion sheet of claim 1;
    a prism sheet provided on one surface of the diffusion sheet;
    a rectangular light guide plate provided on the other surface of the diffusion sheet; and
    a light source provided along a side surface of the light guide plate.

5. The backlight unit of claim 4, wherein
    the light source includes a plurality of dot light sources.

6. A liquid crystal display device comprising:
    the backlight unit of claim 4; and
    a liquid crystal display panel provided adjacent to the prism sheet of the backlight unit.

* * * * *